(12) United States Patent
Jones et al.

(10) Patent No.: US 8,177,445 B2
(45) Date of Patent: May 15, 2012

(54) OVER-CENTER MECHANISM

(75) Inventors: Jeffrey E. Jones, Oceanside, CA (US);
Glenn W Gaarder, Ramona, CA (US);
Michael Janczyk, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 867 days.

(21) Appl. No.: 12/258,791

(22) Filed: Oct. 27, 2008

(65) Prior Publication Data
US 2009/0241290 A1 Oct. 1, 2009

Related U.S. Application Data

(60) Provisional application No. 61/041,332, filed on Apr. 1, 2008.

(51) Int. Cl.
*B41J 29/00* (2006.01)
*B41J 3/407* (2006.01)
*E05F 1/14* (2006.01)
*E05C 21/00* (2006.01)

(52) U.S. Cl. ............ 400/693; 16/291; 16/293; 16/354

(58) Field of Classification Search .......... 16/277, 16/286, 291, 293, 280, 354; 400/693; 101/41, 101/42; *E05F 1/14*
See application file for complete search history.

(56) References Cited

U.S. PATENT DOCUMENTS

| | | | |
|---|---|---|---|
| 833,734 A * | 10/1906 | Diehl | 16/286 |
| 1,276,859 A * | 8/1918 | Bair | 5/36 |
| 2,654,117 A | 10/1953 | Pattison et al. | |
| 2,668,320 A * | 2/1954 | Lustig | 16/289 |
| 3,345,681 A | 10/1967 | Pletscher | |
| 3,438,083 A | 4/1969 | Kirk | |
| 3,608,129 A | 9/1971 | Heyer et al. | |
| 4,065,829 A | 1/1978 | Lautenschlager | |
| 4,127,335 A | 11/1978 | Bogert et al. | |
| 4,457,047 A | 7/1984 | Lautenschlager | |
| 4,684,277 A | 8/1987 | Edstrom et al. | |
| 4,750,682 A * | 6/1988 | Elliott | 242/545 |
| 4,780,013 A | 10/1988 | Sakai | |
| 4,979,265 A | 12/1990 | Grass | |
| 5,393,152 A | 2/1995 | Hattori et al. | |
| 5,488,757 A | 2/1996 | Cohen et al. | |
| 6,505,381 B1 | 1/2003 | Thomson et al. | |
| 7,451,888 B2 * | 11/2008 | Tanaka | 220/263 |
| 7,533,985 B2 * | 5/2009 | Miyake et al. | 347/104 |
| 2006/0010460 A1 * | 1/2006 | Sasaki | 720/600 |

FOREIGN PATENT DOCUMENTS

JP 2004197460 A * 7/2004

* cited by examiner

*Primary Examiner* — Daniel J Colilla

(57) ABSTRACT

An over-center mechanism includes a pivoting member, rotatable about a pivot point between first and second positions, a drive gear, having a first radius, fixedly attached to the pivoting member at the pivot point, a pinion gear, engaged with the drive gear, having a second radius, and an over-center tension spring, eccentrically attached between the drive gear and the pinion gear, to bias the pivoting member toward the first and second positions.

20 Claims, 7 Drawing Sheets

OVER-CENTER MECHANISM

CROSS REFERENCE TO RELATED APPLICATIONS

This Application claims the benefit of provisional patent application Ser. No. 61/041,332, filed Apr. 1, 2008 titled "OVER-CENTER MECHANISM" which application is incorporated by reference herein as if reproduced in full below.

BACKGROUND

The present disclosure relates generally to over-center spring mechanisms. Over-center spring mechanisms are typically used to mechanically hold a pivoting structure in selected resting positions relative to a pivot point. These mechanisms typically include a tension spring that is attached at one end to a fixed structure, and at the other end is attached to the pivoting structure. The position of the spring is such that the spring extends over the pivot point of the pivoting structure at some point during the range of the motion of the pivoting structure. Consequently, the greatest spring force is experienced at a point where the spring applies no moment to the pivoting structure, thus biasing the structure away from the midpoint of its motion.

The force and motion characteristics of over-center spring mechanisms relate to the strength and size of the spring, the position of its attachment to the pivoting structure, and other intervening structure that may be involved in the mechanism. Where an over-center spring mechanism is configured for vertical motion, the spring can be configured to support the weight of the pivoting structure when in a raised position. This can involve the use of a relatively large and strong spring.

BRIEF DESCRIPTION OF THE DRAWINGS

Various features and advantages of the present disclosure will be apparent from the detailed description which follows, taken in conjunction with the accompanying drawings, which together illustrate, by way of example, features of the present disclosure, and wherein.

DETAILED DESCRIPTION

Figure 1:
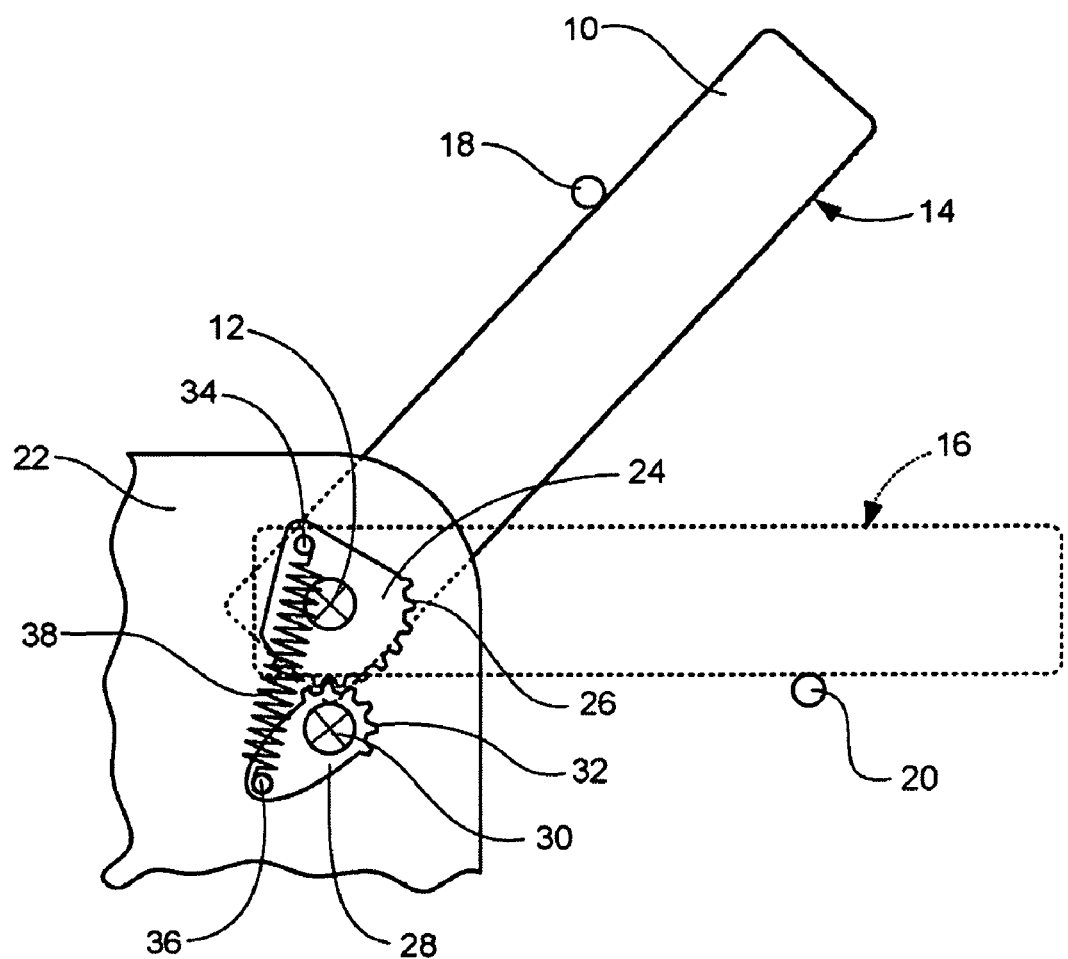
FIG. 1 is a side view of one embodiment of a gear-enhanced over-center spring mechanism in accordance with the present disclosure, showing the pivoting member in the raised position.

Reference will now be made to exemplary embodiments illustrated in the drawings, and specific language will be used herein to describe the same. It will nevertheless be understood that no limitation of the scope of the present disclosure is thereby intended. Alterations and further modifications of the features illustrated herein, and additional applications of the principles illustrated herein, which would occur to one skilled in the relevant art and having possession of this disclosure, are to be considered within the scope of this disclosure.

As used herein, the terms "lever arm" and "moment arm" are distinct. The term "lever arm" is intended to refer to the physical distance from a pivot point of a member to a point of action of an eccentric or rotating force upon that member. The term "moment arm" is intended to refer to the distance between the line of action of an eccentric force upon a pivoting member and a line passing through the pivot point, the distance being measured perpendicularly to the line of the force vector.

The term "over center spring" is recognized by those skilled in the art as referring to a spring that is attached to a pivoting structure, and positioned to rotate or translate across a pivot point or center point as the pivoting structure rotates. An over center spring provides a biasing force upon the pivoting structure in one direction while on a first side of the center point, the biasing force dropping to zero as the spring rotates or translates to the center point, after which the spring provides a biasing force on the pivoting member in the opposite direction on a second side of the center point.

As noted above, over-center spring mechanisms are typically used to mechanically hold a pivoting device such as a door or the like in selected resting positions relative to a pivot point. There are cases where the characteristics of an over-center spring mechanism can be more desirable than other devices such as buckling blades or spring loaded cam blocks. However, there are certain design considerations that affect over-center spring mechanisms. For example, where the pivoting device pivots upwardly, it can be desirable for the force provided by the over-center spring mechanism to be sufficient to support the weight of the pivoting structure when in the raised position. The angular separation of the desired resting positions of the pivoting structure can also be significant in some cases, and this angular separation has an influence on the holding force provided by the spring. Additionally, the appearance and space to contain the over-center spring mechanism can be significant in some cases.

Advantageously, a gear-enhanced over-center spring mechanism has been developed that provides smooth action and reduces the relative amount of spring force that is needed to properly bias the pivoting structure in the desired positions. While this device can be used in many applications, one application for this mechanism that has been used is for a flip-down CD tray for an imaging device such as an ink jet printer.

One embodiment of a gear-enhanced over-center spring mechanism in accordance with this disclosure is depicted in FIGS. 1-4. The over-center spring mechanism generally includes a pivoting member 10, which is pivotally attached at fixed pivot point 12 and can rotate between a first position, indicated at 14, and a second position, shown in dashed lines at 16. As illustrated in FIG. 3A, an upper stop 18 and lower stop 20 can be attached to an adjacent fixed structure and positioned to contact the pivoting member to physically limit its range of travel.

The pivot point 12 of the pivoting member 10 is supported by a support structure or frame 22. Attached to the pivoting member at the pivot point is a drive gear 24 with gear teeth 26 located along a portion of the outside edge of the gear. The drive gear is fixedly attached to the pivoting axle of the pivoting member, and thus rotates in concert with the pivoting member. A pinion gear 28 is also attached to the support structure at a pivot point 30, and includes gear teeth 32 that are located along a portion of the outside edge of the gear and engaged with the teeth of the drive gear. As an alternative to the upper and lower stops 18 and 20 illustrated in FIG. 3A, the pinion gear can include a left stop 19 and right stop 21, as illustrated in FIG. 3B. These stops on the gear surface block the gears from continued rotation once a certain angular position is reached. While two stops are shown on the pinion gear, it is to be understood that stops can alternatively be associated with the drive gear, and either of the gears can be provided with just one stop if desired. Any structure that physically limits the range of angular travel of the pivoting member can function as a stop, whether such structure is associated with the gears, the pivoting member, or some other adjacent structure.

The drive gear 24 includes a spring attachment tab 34 that is located generally on an opposite side of the drive gear pivot point 12 from the gear teeth 26 of the drive gear. Likewise, the pinion gear 28 includes a tab 36 that is located generally on an opposite side of the pinion gear pivot point 30 from the gear teeth 32 of the pinion gear. An over-center tension spring 38 is attached between the tabs of the drive gear and the pinion gear, and applies a force that tends to rotate the two gears in opposite directions.

The drive gear 24 can have a pitch or gear radius that is substantially larger than the pitch radius of the pinion gear 28. In one embodiment, the pinion gear has a pitch radius that is approximately half the pitch radius of the drive gear. Consequently, when the drive gear rotates a given angular distance, the pinion gear will be caused to rotate a substantially larger angular distance. The distance of the spring attachment tabs 34 and 36 from the pivot points of the respective gears provide an eccentric attachment point for the spring, which creates a moment arm for the force of the tension spring 38, which causes the tension spring to apply a torque or moment to the gears. As the gears rotate, the angle of the spring will change and the respective moment arm distances will vary, thus causing the torque applied by the spring to vary. For reasons that will become more clear hereafter, the spring lever arm length of the pinion gear 28 can be substantially larger than the spring lever arm length of the drive gear 24. It is to be appreciated that while the embodiment shown in the figures includes a drive gear with a radius that is substantially larger than the radius of the pinion gear, this is only one of many possible embodiments. The relative radii of the drive gear and pinion gear can vary while still providing a functional gear-enhanced over-center mechanism. For example, the drive gear and pinion gear can have the same radius, or the pinion gear can be larger than the drive gear.

As the pivoting member 10 is rotated, the drive gear 24, pinion gear 28 and over-center spring 38 act to bias the pivoting member 10 toward the first position 14 and the second position 16. The operation of the mechanism is illustrated in FIGS. 1-4. In the condition shown in FIG. 1, the pivoting member is in the fully up position 14. In this position, the pinion gear and drive gear are rotated so that the spring attachment tabs 34, 36 place the over-center spring 38 to the left of the center points of the gears. In this position the moment arms of the drive gear and pinion gear are at their maximum length, which tends to increase the torque provided by the spring.

Because the drive gear 24 is fixedly attached to the axle of the pivoting member 10 and the spring 38 is attached to the tab 34 on the drive gear, the drive gear acts as a lever so that the spring exerts a lifting force on the pivoting member to hold the pivoting member in the up position. At the same time, the spring exerts a counter-rotating force on the pinion gear 28, which, through the gear mesh, provides a rotational force on the drive gear to provide additional lift to the pivoting member. It has been found that the gear train of this over-center spring mechanism provides enough additional lift that the spring force can be reduced by a factor of about 4 compared to what it would otherwise be (i.e. without the pinion gear) and still hold the pivoting member up.

Figure 2:
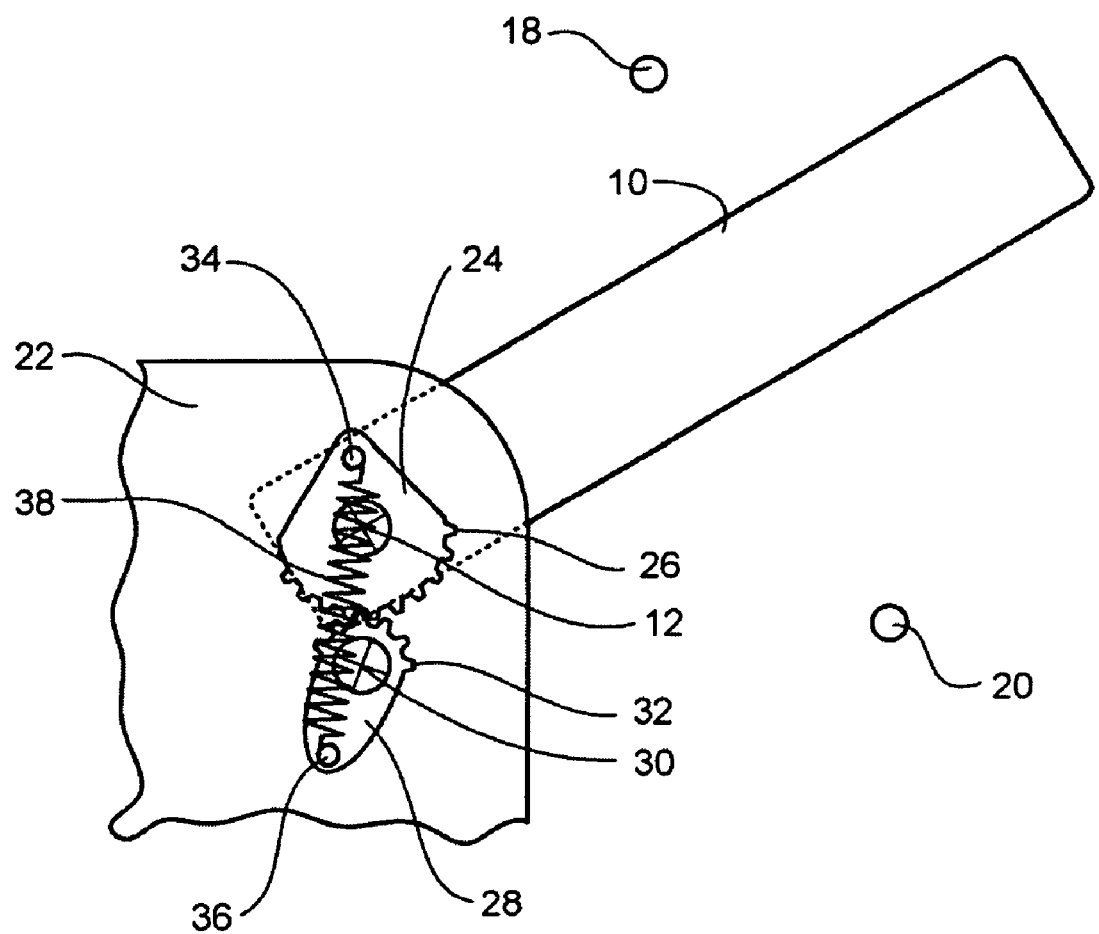
FIG. 2 is a side view of the gear-enhanced over-center spring mechanism of FIG. 1, showing the pivoting member in a partially lowered, but not yet past center position.

When the pivoting member 10 is rotated downward (e.g. under manual force applied by a user) from the up position 14 toward the downward position (16 in FIG. 1), the drive gear 24 rotates clockwise with the pivoting member. At the same time, the pinion gear 28 is caused to rotate counter clockwise by the drive gear, and rotates faster than the drive gear because of its smaller pitch radius. The beginning of this motion is shown in FIG. 2. During this motion several things happen simultaneously. First the spring 38 begins to move toward the center of the two gears. As this happens, the spring stretches, since the spring attachment tabs on the drive gear and pinion gear rotate oppositely away from each other. This aspect of the operation of the mechanism causes the spring to apply a greater tensile force to the gears.

At the same time, however, the rotation of the gears reduces the length of the moment arms of each of the gears, thus tending to reduce the torque that the spring 38 imposes upon the gear train. Additionally, since the pinion gear rotates faster than the drive gear (due to its smaller pitch radius), its moment arm diminishes faster as the mechanism approaches the center position. Because of this motion, the force to rotate the pivoting member downward will decrease and the spring will rotate over center quickly and cleanly. It will be apparent that when the device reaches the center position—that is, when the spring is directly over the pivot points of the drive gear and pinion gear—the moment arms of the drive gear and pinion gear will have diminished to zero, and the torque provided by the spring on the gear train will thus also become zero. Thus, at the instant that the spring is at the center position, the spring will impose no rotational torque on the pivoting member.

Figure 3A:
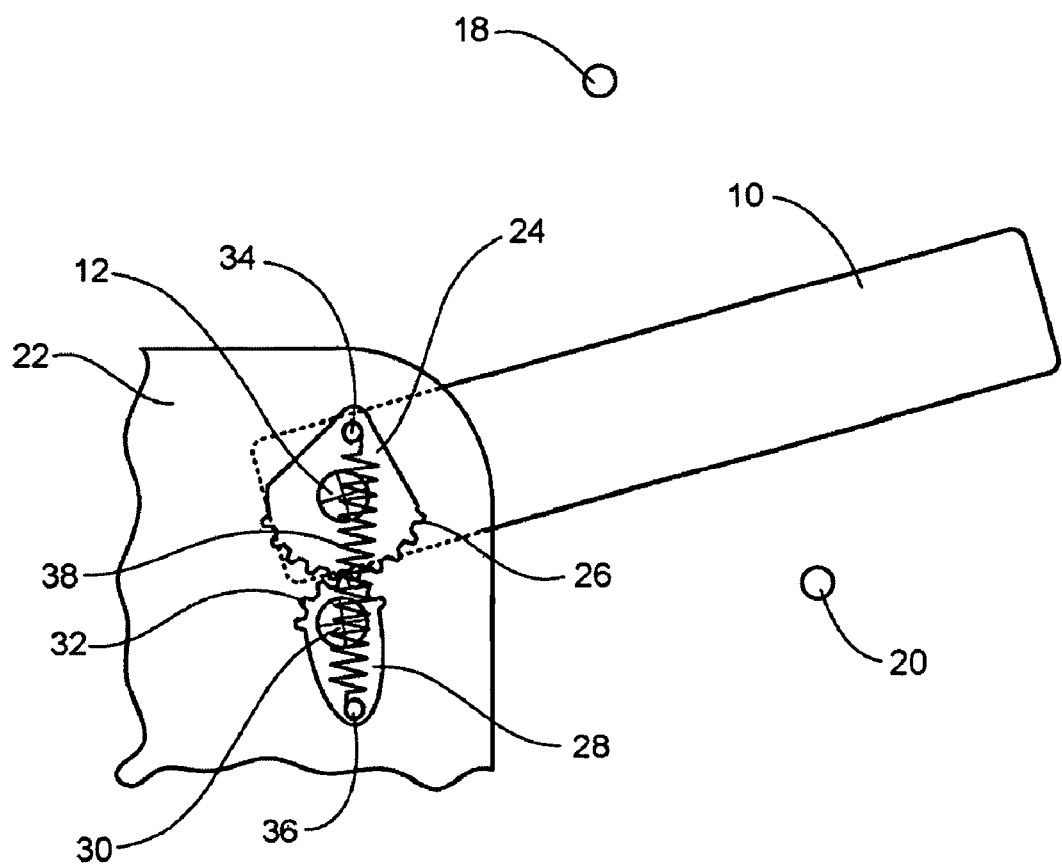
FIGS. 3A and 3B are side views of the gear-enhanced over-center spring mechanism of FIG. 1, showing the pivoting member in a partially lowered and slightly past center position.
Figure 3B:
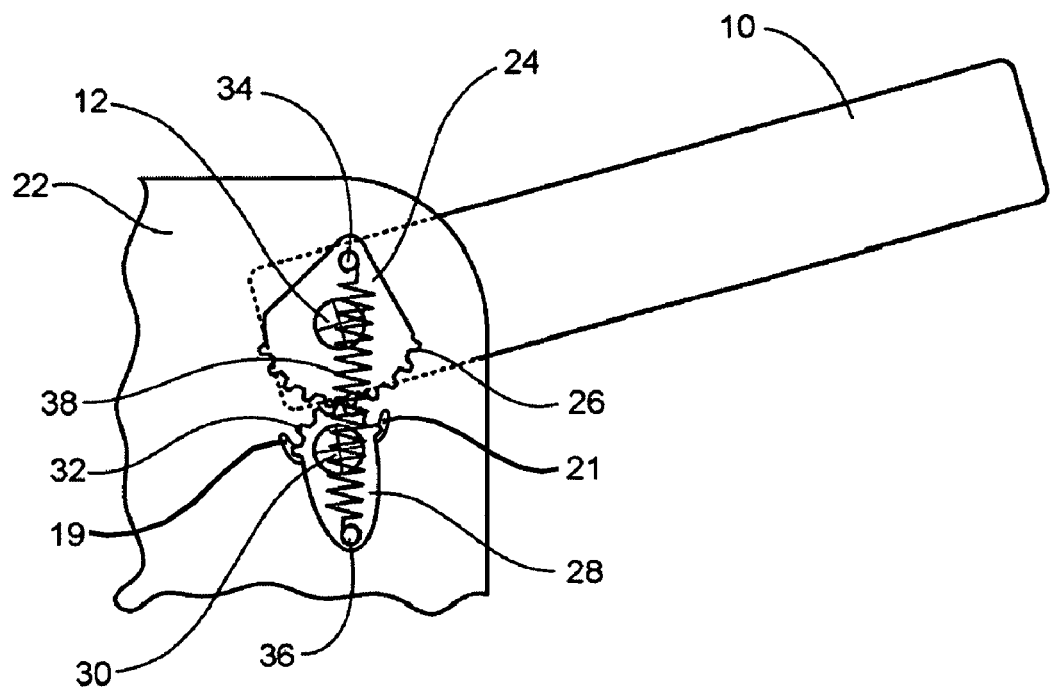
Figure 4:
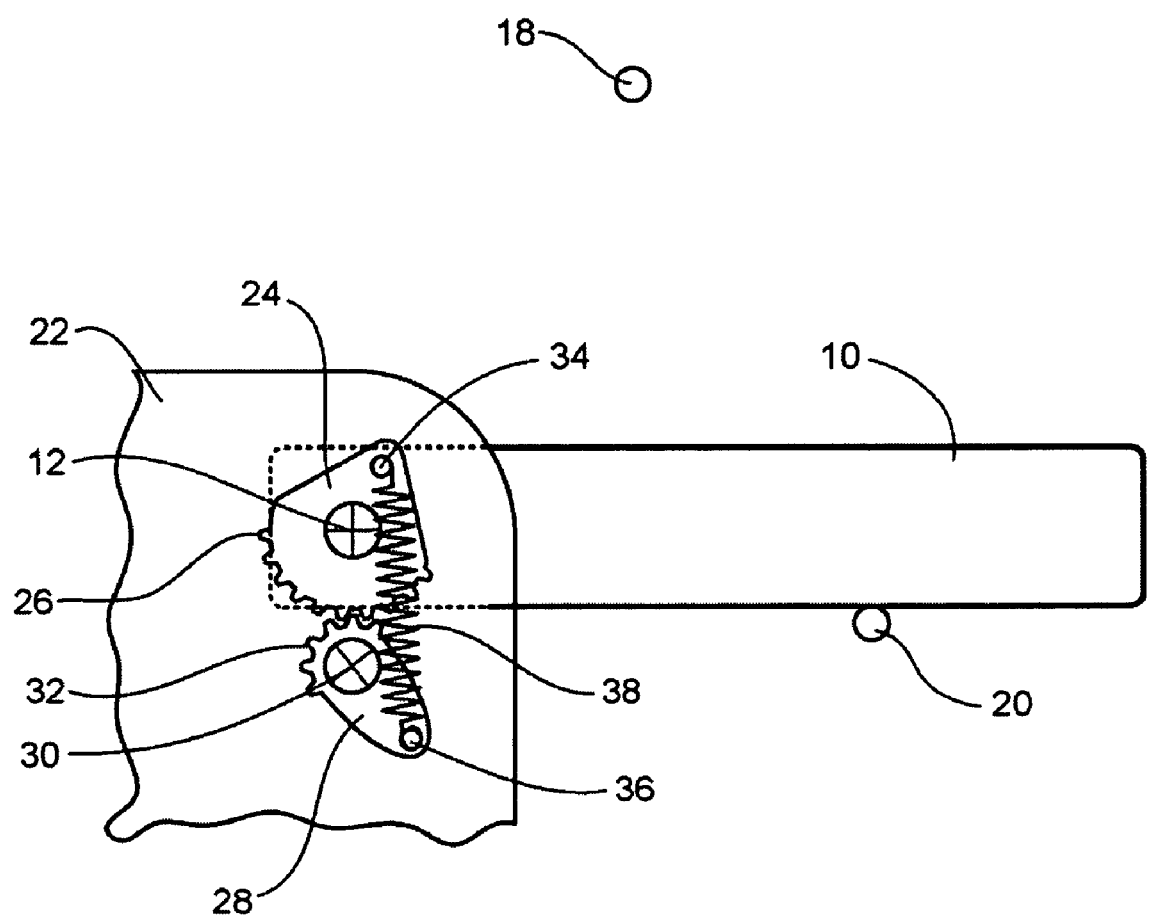
FIG. 4 is a side view of the gear-enhanced over-center spring mechanism of FIG. 1, showing the pivoting member in the lowered position.

Referring to FIGS. 3A and 3B, once rotated over center, the spring 38 provides a force which begins to act in the opposite direction and biases the pivoting member 10 toward the downward position in the same way that it biased the pivoting member up when the spring was on the other side of center. That is, the drive gear 24 acts as a lever so that the spring exerts a downward force on the pivoting member when the spring is on the right side of center. At the same time, the spring exerts a counter-clockwise torque on the pinion gear, which provides an additional rotational torque on the drive gear, through the gear engagement, which also drives the pivoting member down until the pivoting member eventually reaches the fully downwardly rotated position shown in FIG. 4. In this position both the weight of the pivoting member and the torque of the spring will help to hold the pivoting member down.

To rotate the pivoting member 10 back to the raised position, the opposite steps are taken. That is, the user pushes upwardly on the pivoting member, against the force of the spring, until the mechanism again rotates over center, after which the force of the spring will assist in rotating the pivoting member to the fully raised position, as shown in FIG. 1. In this position the force of the spring can hold the pivoting member in that position until it is desired to lower it again.

The result of this design is a holding-force on the pivoting member that is an additive combination of (i) the spring's over-center action on the drive gear's spring mounting location, (ii) the driven pinion's resultant driving torque acting through the gear teeth, and (iii) the pinion acting on the spring to increase the spring's angle, therefore increasing the moment arm on the gear. This design provides a significant amount force by combining the over-center spring action with a gear and pinion that increases the degree of rotation of the spring into its functional position and adds additional lift to the assembly through the gear train which allows for a much smaller spring to be used. The result is a small mechanical package with relatively light forces able to provide sufficient output torque where needed.

Figure 5:
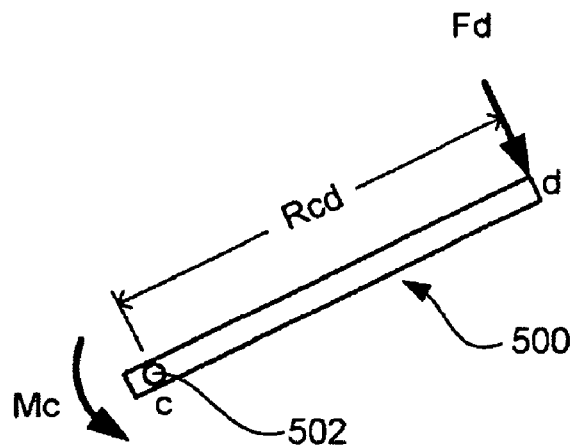
FIG. 5 is a free body diagram of one embodiment of the pivoting member.
Figure 6:
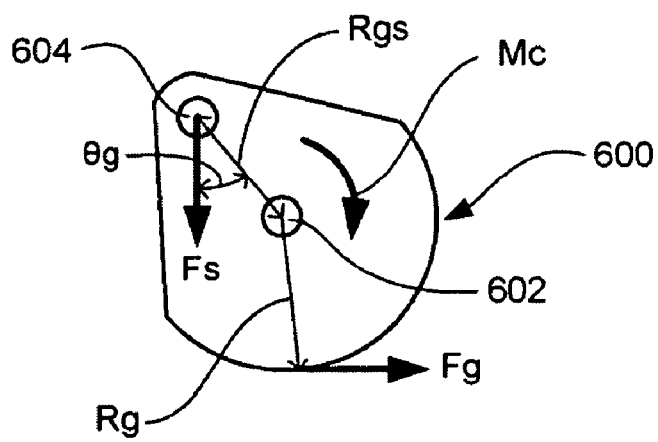
FIG. 6 is a free body diagram of one embodiment of the drive gear.
Figure 7:
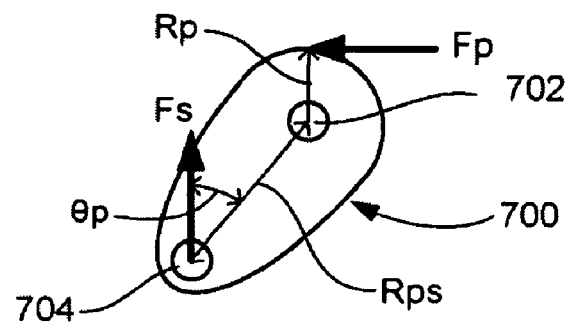
FIG. 7 is a free body diagram of one embodiment of the pinion gear.

Static free body diagrams of a pivoting member 500, drive gear 600 and pinion gear 700 as used in an embodiment of a gear-enhanced over-center spring mechanism in accordance with the present disclosure are shown in FIGS. 5-7. Viewing FIG. 5, the pivoting member 500 is a lever arm of length Rcd. A downward force Fc (which can include the weight of the pivoting member) tends to rotate the pivoting member about the pivot point 502 in the clockwise direction, requiring an oppositely directed moment Mcd to maintain static equilibrium. That is, for static equilibrium, $$Mc=(Rcd)(Fd) \quad (1)$$

Referring to FIG. 6, the drive gear 600 rotates about a pivot point 602 and has the spring attached at spring attachment tab 604. The drive gear has a gear pitch radius Rg and a spring lever arm length of Rgs. The pivoting member moment Mcd rotates about the pivot point 602, and is opposed by a moment produced by the gear force Fp provided by the pinion gear (700 in FIG. 7) and by a moment provided by the spring force Fs. For static equilibrium, $$Mc=(Rgs)(Fs)(\sin \theta g)+(Rg)(Fg) \quad (2)$$

In this equation, the angle θg represents the angular deviation between the spring force vector Fs and the radial axis Rgs of the drive gear. It will be apparent that this angle will go from some maximum value on one side of center to zero when the spring reaches the center location, and will go from zero to a maximum value on the other side of center, the sum of the maximum angles on each side of center representing the total angular range of motion of the pivoting member. In one embodiment, a maximum angular range of travel of about 40° has been used.

Referring to FIG. 7, the pinion gear 700 rotates about pivot point 702, and has the spring attached at spring attachment tab 704. The pinion gear has a gear pitch radius of Rp and a spring lever arm of length Rps. The spring force Fs produces a rotational moment of the pinion gear about its center, which is countered by the moment produced by the gear force Fp. For static equilibrium, $$(Rp)(Fp)=(Fs)(\sin \theta p)(Rps) \quad (3)$$

As with the drive gear, in this equation, the angle θp represents the angular deviation between the spring force vector Fs and the radial axis Rps of the pinion gear.

The three equations presented above can be combined to solve for Fs, giving the following relationship:

$$Fs = \frac{(Fc)(Rcd)}{(Rgs)(\sin\theta g) + (Rg/Rp)(Rps)(\sin\theta p)} \quad (4)$$

For design purposes, the values of Fcd and Rcd are given. Because this equation includes many other design variables, a desired angular range for θgs has been selected, with other design values then selected in order to minimize Fs.

As noted above, the gear radius Rg of the drive gear can be significantly larger than the radius Rp of the pinion gear. At the same time, the length of the pinion spring lever arm Rps can be significantly larger than the length of the drive gear spring lever arm Rgs. This approach helps to minimize Fs while providing a smooth action that moves over-center quickly. It is to be appreciated that while the embodiment shown herein provides a pinion lever arm Rps that is larger than the drive gear lever arm Rgs, different relative lever arm lengths can be used. For example, in other embodiments, the two lever arms can be equal, or the drive gear lever arm can be larger. A variety of combinations of drive gear and pinion gear radii, in combination with different lever arm lengths can be used in a gear-enhanced over-center spring mechanism in accordance with this disclosure.

A flip-down CD tray having an embodiment of the gear-enhanced over-center spring mechanism has been built and tested with the following dimensions and values:

| | | |
|---|---|---|
| Fc = 2 N | Rgs = 7.48 mm | Rps = 10 mm |
| Rcd = 99.4 mm | Rg = 9.83 mm | Rp = 4.92 mm |

Using these dimension and force values, the nominal spring force Fs to adequately bias the pivoting member up is about 14.7 N. In contrast, the same force would have to be about 61.5 N without the gear train. In addition to the relatively low spring force, the small radius and long lever arm of the pinion gear causes the spring to move over center quickly. Consequently, in this embodiment the CD tray snaps into the up position from about 10 degrees away from the center of travel, and snaps into the down position from about 10 degrees away from the center of travel.

Figure 8:
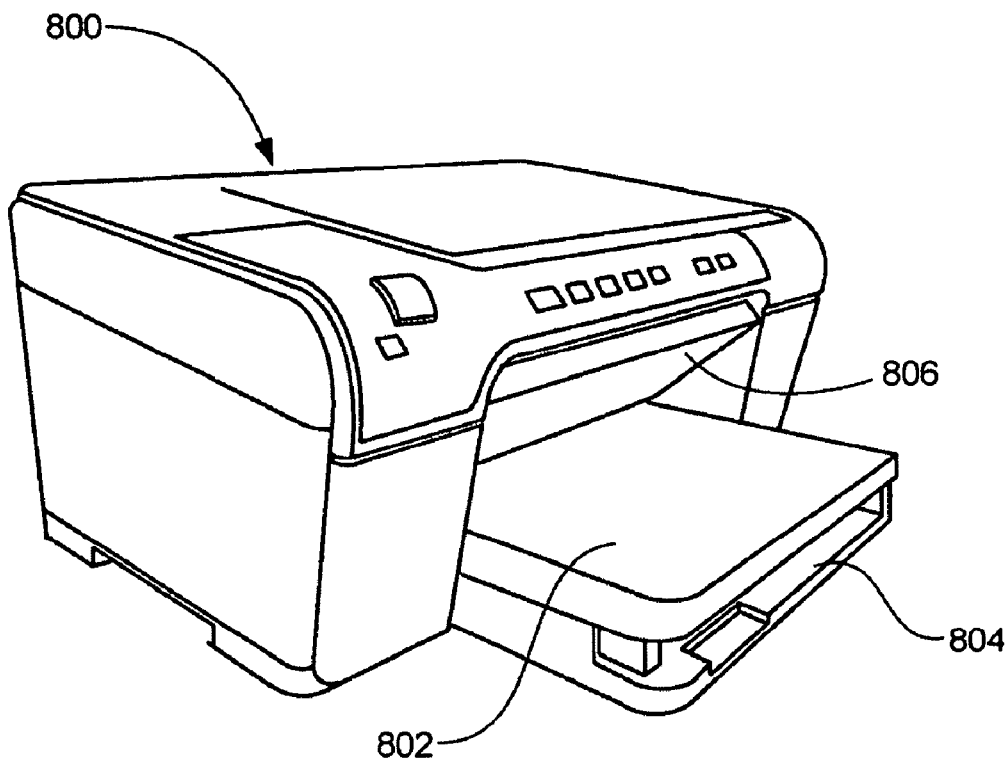
FIG. 8 is a perspective view of a printer device having a moveable CD tray that can be actuated using one embodiment of a gear-enhanced over-center spring mechanism in accordance with the present disclosure, showing the CD tray in the raised position.
Figure 9:
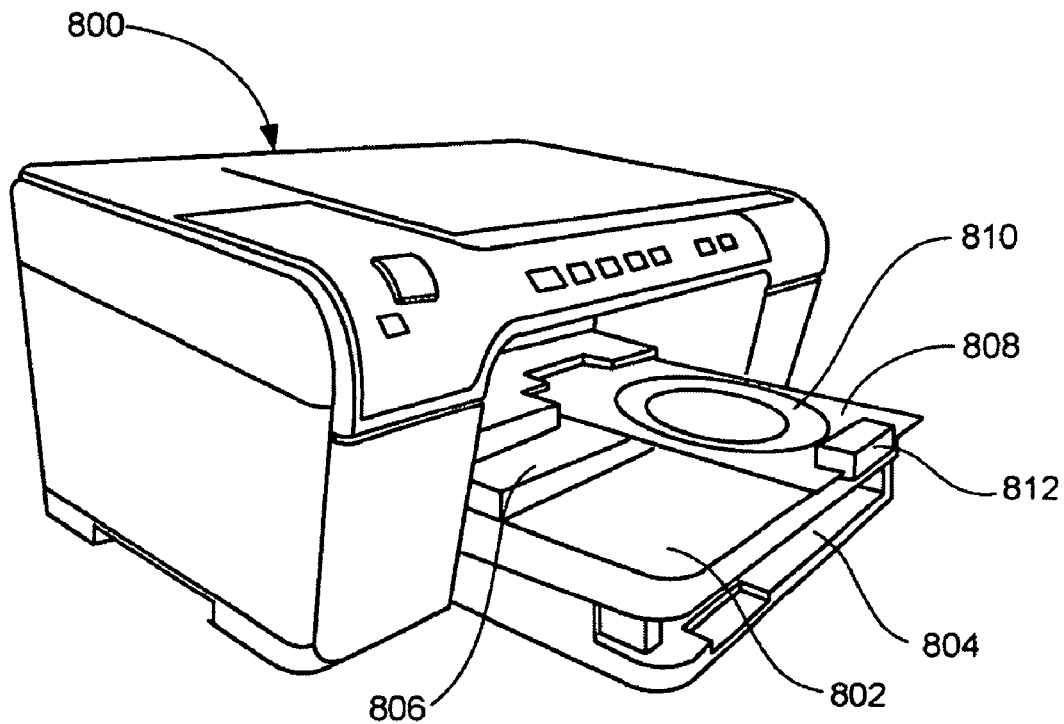
FIG. 9 is a perspective view of the printer device of FIG. 8, with the CD tray in the lowered position and a CD carrier installed.

An over-center spring mechanism configured in accordance with the present disclosure can be used in many applications. As noted above, one application is in a moveable CD tray for a printer device. Such a printer device is shown in FIGS. 8 and 9. This printer device 800 is an ink jet printer, and is capable of printing images and indicia on compact disks (CDs), digital video disks (DVDs) and the like.

The printer 800 includes a combined paper tray 802 and output tray 804 that are used to supply paper or other media for printing, and to receive the completed prints during normal operation. This printer also includes a CD tray 806 that is configured to be moved to a raised position, as shown in FIG. 8, whenever the printer is being used to print upon media from the paper tray. However, when it is desired to print upon a CD or the like, the CD tray can be rotated downward to the position shown in FIG. 9. In this lowered position, a CD carrier 808 can be inserted into the CD tray. In this position, a user can place a CD or DVD in the circular CD slot 810 of the CD tray, and push against the handle 812 of the CD carrier to slide the tray into the printer to place the disk in the proper position for printing. When printing is completed, the user pulls the CD carrier out and removes the printed CD.

In order to allow the CD tray 802 to be conveniently available for use, yet be out of the way for normal printing, an over-center spring mechanism can be used to bias the CD tray between the upwardly rotated position of FIG. 8, and the downwardly rotated position of FIG. 9. In an application such as a flip down CD tray for a printer device, the drive gear and pinion gear can be made of low cost polymer materials. While other mechanisms are also sometimes used for this type of application, the gear-enhanced over-center spring mechanism disclosed herein has a good ability to absorb tolerance variations and material creep over time. This can allow the use of low-cost materials for the CD tray and surrounding functional parts.

The over-center gear and pinion apparatus disclosed herein compounds the force and over-center gain of an over-center spring mechanism, and also reduces the non-concentric static loading on the system due to reduced spring tension. The system provides a gain due to the relationship of the spring, the drive gear and the driven pinion. In the embodiment shown herein, there are two factors working together to increase the system gain in this respect. First, the exaggerated off-center mounting of the spring increases the spring over-center travel distance by attaching the ends of the spring to off-centered mounts on both the drive gear and the pinion. This increases the lateral distance the spring-ends travel for a given angular displacement of the gear. Second, because the pitch diameter of the driven pinion is substantially smaller than the pitch diameter of the drive gear, this causes the driven end of the spring to pass through a larger arc than the driving end, which adds even more lateral displacement.

This system also produces a torque gain due to the spring acting on the driven pinion. The drive gear starts the transfer of torque by interacting with the pinion via the gear teeth. As the spring passes over the center-line of the axis of rotation of the drive gear and pinion system, the spring begins to apply a moment to the pinion in the direction of rotation. This developing rotational torque is transferred back to the drive gear via the gear teeth. The result is a holding-force on the CD-Tray that is an additive combination of the spring's over-center action on the drive gear's spring mounting location, and the pinion's resultant driving torque acting through the gear teeth. In this particular design the spring force size was able to be reduced by a factor of about 4 compared to other designs.

This over-center spring mechanism provides a significant amount of force by combining an over-center spring action with a gear and pinion that increases the degree of rotation of the spring into its functional position and adds additional lift to the assembly through the gear train, which allows for a much smaller spring to be used. The result is a small mechanical package with relatively light forces able to provide sufficient output torque where needed. It snaps into the up position from about 10 degrees away and snaps into the down position from about 10 degrees away, and avoids creep, part variations, and other issues.

It is to be understood that the above-referenced arrangements are illustrative of the application of the principles disclosed herein. It will be apparent to those of ordinary skill in the art that numerous modifications can be made without departing from the principles and concepts of this disclosure, as set forth in the claims.

What is claimed is:

1. An over-center mechanism, comprising:
a pivoting member pivotally attached at and extended in a first direction from a pivot point, the pivoting member rotatable about the pivot point between first and second positions;
a drive gear, having a first radius, fixedly attached to the pivoting member at the pivot point;
a pinion gear, engaged with the drive gear, having a second radius; and
an over-center tension spring, eccentrically attached between the drive gear and the pinion gear, positioned to bias the pivoting member toward the first and second positions.

2. An over-center mechanism in accordance with claim 1, wherein the pivoting member is a CD tray of a printer device.

3. An over-center mechanism in accordance with claim 1, wherein the second radius of the pinion gear is smaller than the first radius of the drive gear.

4. An over-center mechanism in accordance with claim 1, wherein the pivoting member has an axis extended through the pivot point and along a length thereof, and the pinion gear has an axis extended through a pivot point thereof and through a spring attachment point thereof, and
wherein, when the pivoting member is in the first position, the axis of the pivoting member intersects the axis of the pinion gear to a first side of an axis extending through the pivot point of the pinion gear and a pivot point of the drive gear, and wherein, when the pivoting member is in the second position, the axis of the pivoting member intersects the axis of the pinion gear to the first side of the axis extending through the pivot point of the pinion gear and the pivot point of the drive gear.

5. An over-center mechanism in accordance with claim 1, wherein the spring is eccentrically attached to the drive gear and the pinion gear at respective spring attachment points spaced a lever arm distance from respective pivot points of the drive gear and the pinion gear, and wherein the respective spring attachment points are generally opposite respective gear engagement regions of the drive gear and the pinion gear.

6. An over-center mechanism in accordance with claim 5, wherein the second radius of the pinion gear is smaller than the first radius of the drive gear, and the lever arm distance of the pinion gear is larger than the lever arm distance of the drive gear.

7. An over-center mechanism in accordance with claim 5, wherein the respective gear engagement regions of the drive gear and the pinion gear are provided along a portion of an edge of the drive gear and the pinion gear, and wherein the respective spring attachment points of the drive gear and the pinion gear are provided at respective ends of the drive gear and the pinion gear generally opposite the respective gear engagement regions of the drive gear and the pinion gear.

8. An over-center mechanism in accordance with claim 1, wherein the spring is positioned and selected to provide a biasing force sufficient to rotate the pivoting member toward the first position or the second position from a position that is more than about 10 degrees away from a center position thereof.

9. An over-center mechanism in accordance with claim 1, further comprising a stop, positioned to physically contact the pivoting member to limit a range of motion of the pivoting member.

10. An over-center mechanism in accordance with claim 1, further comprising a stop, extending from at least one of the pinion gear and the drive gear, positioned to limit the range of motion of the pinion gear and the drive gear.

11. An over-center mechanism, comprising:
a pivoting member pivotally attached at and extended in a first direction from a pivot point, the pivoting member configured to rotate about the pivot point between first and second positions;
a drive gear attached to pivot with the pivoting member about the pivot point;
a pinion gear engaged with the drive gear; and combined means for biasing the pivoting member toward the first and second positions, and for rotationally biasing the pinion gear against the drive gear to provide an additive moment to bias the pivoting member toward the first and second positions.

12. An over-center mechanism in accordance with claim 11, further comprising means for limiting the angular range of motion of the pivoting member.

13. An over-center mechanism in accordance with claim 12, wherein the means for limiting the angular range of motion of the pivoting member comprises a stop, positioned to physically contact at least one of the pivoting member and at least one of the pinion gear and the drive gear.

14. An over-center mechanism in accordance with claim 11, wherein the combined means for biasing the pivoting member toward the first and second positions, and for rotationally biasing the pinion gear against the drive gear comprises a tension spring eccentrically attached between the drive gear and the pinion gear.

15. An over-center mechanism in accordance with claim 14, wherein the tension spring is eccentrically attached to the drive gear and the pinion gear at respective spring attachment points spaced a lever arm distance from respective pivot points of the drive gear and the pinion gear, and wherein the respective spring attachment points are provided at respective ends of the drive gear and the pinion gear generally opposite respective gear engagement regions of the drive gear and the pinion gear.

16. An imaging device, comprising:
 means for applying indicia to print media;
 a pivoting member pivotally attached at and extended in a first direction from a pivot point, the pivoting member configured for holding print media, and rotatable about the pivot point between a raised position and a lowered position;
 a drive gear, having a first radius, fixedly attached to the pivoting member at the pivot point;
 a pinion gear, engaged with the drive gear, having a second radius; and
 an over-center tension spring, eccentrically attached between the drive gear and the pinion gear, positioned to bias the pivoting member toward the raised and lowered positions.

17. An imaging device in accordance with claim 16, wherein the means for applying indicia to print media comprises an ink jet printer mechanism.

18. An imaging device in accordance with claim 16, further comprising a CD tray, removably attachable to the pivoting member when in the lowered position, configured for positioning a CD for receiving indicia from the means for applying indicia.

19. An imaging device in accordance with claim 16, wherein the second radius of the pinion gear is smaller than the first radius of the drive gear, and the spring is eccentrically attached to the drive gear and the pinion gear at respective spring attachment points spaced a lever arm distance from respective pivot points of the drive gear and the pinion gear, and wherein the lever arm distance of the pinion gear is larger than the lever arm distance of the drive gear.

20. An imaging device in accordance with claim 16, wherein the drive gear and the pinion gear have respective gear engagement regions along a portion of an edge thereof, and wherein the drive gear and the pinion gear have respective spring attachment points at an end thereof generally opposite the respective gear engagement regions thereof.

\* \* \* \* \*